(12) United States Patent
Burmann

(10) Patent No.: US 7,350,420 B2
(45) Date of Patent: Apr. 1, 2008

(54) DEVICE FOR MEASURING PRE-STRESSING FORCE IN A BOLT-NUT CONNECTION

(75) Inventor: Bjorn Burmann, Husøystrand 5, Husøysund (NO) 3132

(73) Assignee: Bjorn Burmann, Husoysund (NO)

( * ) Notice: Subject to any disclaimer, the term of this patent is extended or adjusted under 35 U.S.C. 154(b) by 107 days.

(21) Appl. No.: 10/560,326

(22) PCT Filed: Jun. 11, 2004

(86) PCT No.: PCT/NO2004/000169

§ 371 (c)(1),
(2), (4) Date: May 22, 2006

(87) PCT Pub. No.: WO2004/111593

PCT Pub. Date: Dec. 23, 2004

(65) Prior Publication Data

US 2006/0225511 A1    Oct. 12, 2006

(30) Foreign Application Priority Data

Jun. 13, 2003   (NO) .................................. 20032696

(51) Int. Cl.
*F16B 31/02* (2006.01)
(52) U.S. Cl. ............................................. 73/761
(58) Field of Classification Search .................. 73/761
See application file for complete search history.

(56) References Cited

U.S. PATENT DOCUMENTS

| | | | | |
|---|---|---|---|---|
| 4,033,394 A | * | 7/1977 | Capuano | 411/278 |
| 4,535,631 A | | 8/1985 | Sinha et al. | |
| 4,575,274 A | * | 3/1986 | Hayward | 403/2 |
| 4,876,895 A | * | 10/1989 | Kao | 73/761 |
| 4,889,457 A | | 12/1989 | Hageman | |
| 5,044,204 A | | 9/1991 | Leighton | |
| 5,049,017 A | * | 9/1991 | Reynolds | 411/432 |
| 5,783,751 A | | 7/1998 | Maw et al. | |
| 5,890,857 A | * | 4/1999 | Herrera | 411/11 |
| 6,789,990 B1 | * | 9/2004 | Harris et al. | 411/206 |

* cited by examiner

*Primary Examiner*—Max Noori
(74) *Attorney, Agent, or Firm*—Woodard, Emhardt, Moriarty, McNett & Henry LLP

(57) ABSTRACT

A device for measuring pre-stressing force in a bolt/nut connection, comprising a screw nut that is provided with a sensor means for sensing the pre-stressing force. The nut (1) is of standard design, and the nut itself constitutes a sensor body in that, in the outer peripheral surface (2) of the nut, there is machined at least one recess (3) in which there is placed a sensor (4) that is adapted for sensing mechanical stress in the nut, and for providing a signal representing the stress, for transmission to an external recording device.

9 Claims, 2 Drawing Sheets

DEVICE FOR MEASURING PRE-STRESSING FORCE IN A BOLT-NUT CONNECTION

Applicant claims foreign priority benefits under Title 35 U.S.C. §119 of Norway Patent Application No. 20032696 filed Jun. 13, 2003.

The invention relates to a device for measuring pre-stressing force in a bolt-nut connection, comprising a screw nut that is provided with a sensor means for sensing the pre-stressing force.

The problem of adjusting and maintaining the correct pre-stressing in bolt-nut connections has been strongly focused in the later years. The reason is that this is a complex problem, as attention must be paid to different, and not ideal, mechanical boundary conditions. The consequences of an incorrect pre-stressing in bolts on critical structures may be catastrophic.

Various solutions have appeared trying to solve the problems, inter alia devices based on measuring equipment of different types. A common solution is to measure the elongation of a bolt by means of strain gauges placed directly on the bolt. Another solution is to measure the surface pressure between nut and support by means of different techniques. Inter alia, there are used mechanical/optical methods and different stress meters shaped as a spacing washer.

The known solutions function well under relatively ideal conditions, but have great measuring-technical weaknesses when the boundary conditions change. The known solutions are limited to a maximum diameter as the measuring element is subjected to "inverting" because of a relatively low rigidity in the construction in case of large diameters. In addition, these solutions have the drawback of having a relatively large "building height". This may vary in the range 15-25 mm. Thereby the bolt will often be too short and has to be changed. In "narrow" structures it is often the case that one does not have sufficient space for introducing longer bolts, and the equipment therefore can not be installed. The solutions which also must have cables mounted on the sensors, are very exposed to damages and thereby breakdown of the sensors.

A device of the introductorily stated type is known from DE 1 124 729. This publication shows a device for measuring pre-stressing forces in a screw connection, wherein a machine element designed as a measuring element may be a screw nut. In this known structure, the nut is divided transversely to the thread axis, and between the nut members there is placed a sensor element in the form of a piezoelectric crystal device, means being provided for clamping the nut members together. It is here the question of a separate sensor measuring the force against the support.

In this known structure it is a weakness that the lower part of the nut is without threads, so that thread height is lost, as the nut in this region is not in engagement with corresponding threads on the bolt. Therefore both nut and bolt must be made substantially higher in order to be able to absorb the same (standardized) clamping force. This is an essential weakness in connection with structures wherein there is not sufficient space to or desirable to extend the bolt.

This known solution further results in a weakened nut in that there is machined an annular groove in which the sensor element is placed, and that the nut is split into an upper and a lower part. When the structure is subjected to stress, there will arise bending moments so that the gap between the nut members will change. Over time the elasticity of the structure will change, so that a loss of pre-stressing takes place. The result is a structure having a reduced long-term stability.

The object of the invention is to provide a device of the introductorily stated type wherein the above-mentioned problems and weaknesses are eliminated or substantially reduced.

For achieving the above-mentioned objects there is provided a device of the stated type which, according to the invention, is characterised in that the nut is of standard design and that the nut itself constitutes a sensor body in that, in the outer peripheral surface of the nut, at a chosen distance from the abutting surface of the nut against the support, there is machined at least one recess in which there is placed a sensor that is adapted for sensing mechanical stress in the nut, and for providing a signal representing the stress, for transmission to an external recording device.

The invention will be further described below in connection with an exemplary embodiment with reference to the drawings, wherein FIG. 1 shows a plan view of a standard hexagonal nut which is provided with a device according to the invention:

Figure 1:
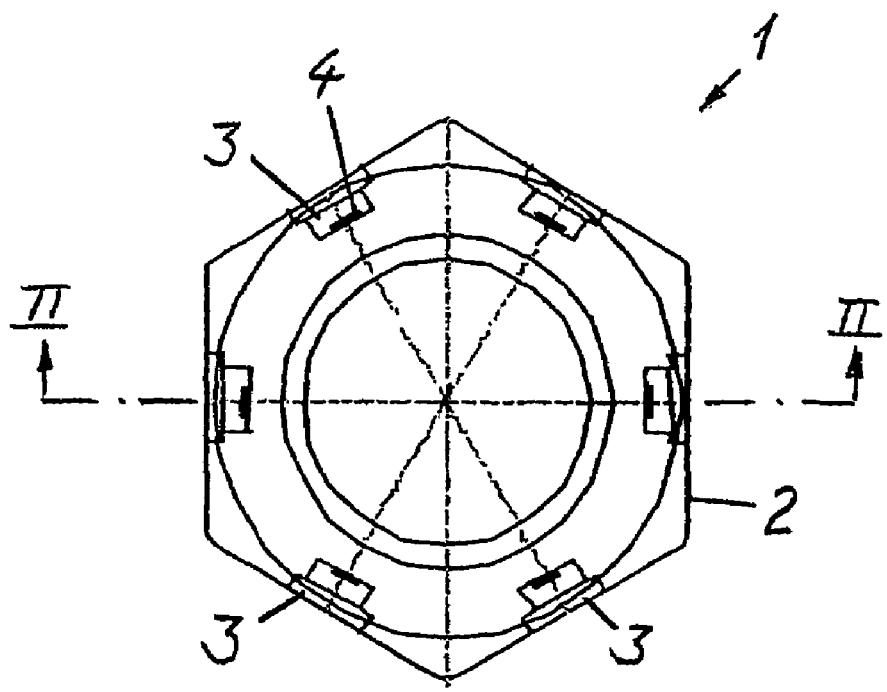
Figure 2:
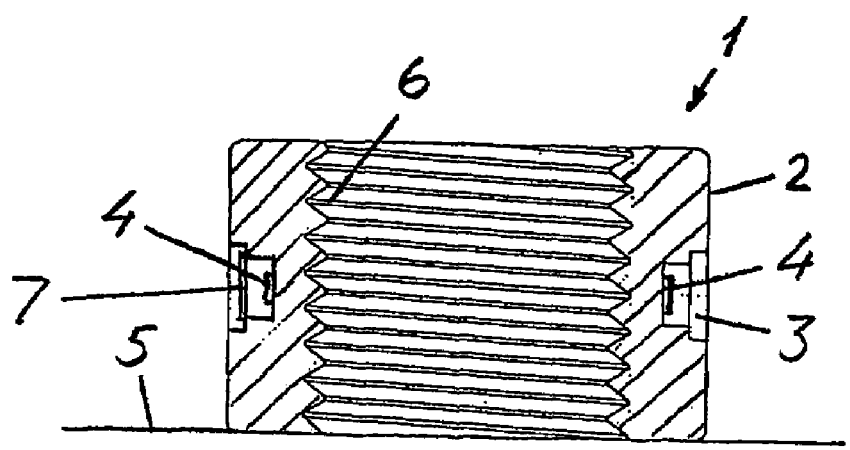
FIG. 2 shows a cross-section of the nut along the line II-II in FIG. 1.

The device shown in FIGS. 1 and 2 comprises a nut which in itself constitutes a force-measuring sensor body. The shown nut 1 is a hexagonal standard nut wherein a number of recesses 3 are machined in the outer peripheral surface of the nut, in which recesses there are placed respective sensor elements 4. These are of a type adapted for sensing mechanical stress in the nut, and for producing a signal representing the stress and which in a suitable manner is transmitted to an external recording device (not shown). Relevant types of sensor elements will be mentioned further below.

The number of recesses 3 in the nut will depend on the nut size and the relevant use. The recesses preferably will be placed so that they have a diametrically opposite location in pairs.

The recesses 3 will be placed at a chosen distance from the abutting surface of the nut against the support 5, and usually approximately mid-way between the upper side and the underside of the nut. As appears from the drawing, the recesses usually have a depth corresponding approximately to half the wall thickness of the nut. In the embodiment of FIG. 2, the nut has approximately eight threads 6, and the recesses 3 are shown to be placed on a level with the third to forth thread, reckoned from the upper and lower surfaces of the nut.

By means of this sensor arrangement, the sensors 4 measure only a part of the total mechanical stress appearing in the nut when this is tightened on an appurtenant bolt (not shown), which part is representative of the total stress in the nut. The threads, which are "soft", appear such that they equalize dissimilar stress distribution from the contact surface of the nut, and the measurement thereby becomes less influenced by varying boundary conditions.

By means of this arrangement the nut is given an entirely new property in that the nut itself constitutes a sensor body.

By extreme boundary conditions, when for instance the bolt/nut connection join soft materials; and/or in structures wherein the bolts may attain an inclined position in relation to the abutment surface of the hole, the nut may be shaped with a spherically convex abutment surface that is adapted for abutment against a corresponding spherically concave surface of e.g., a thin washer which is then used. Alternatively, the abutment surface of the nut may be concave, and the surface of the support correspondingly convex. The inclined position of the nut against the support thereby is straightened, and thereby it will also in such a case be possible to carry out a representative measurement.

Figure 3:
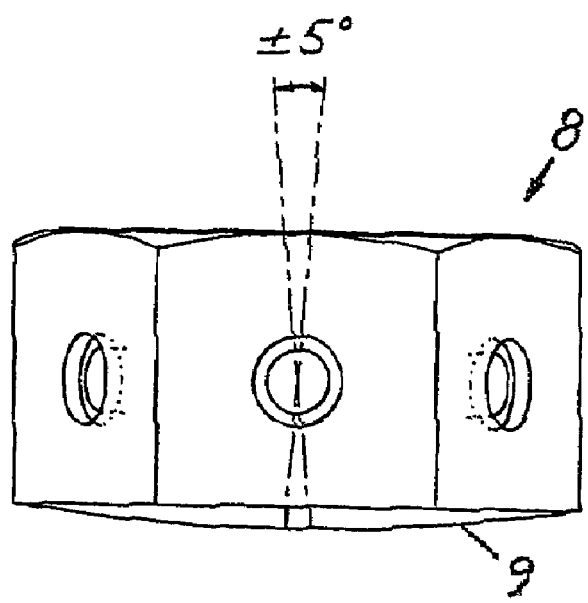
FIG. 3 shows a side view of a nut having a convex abutment surface.
Figure 4:
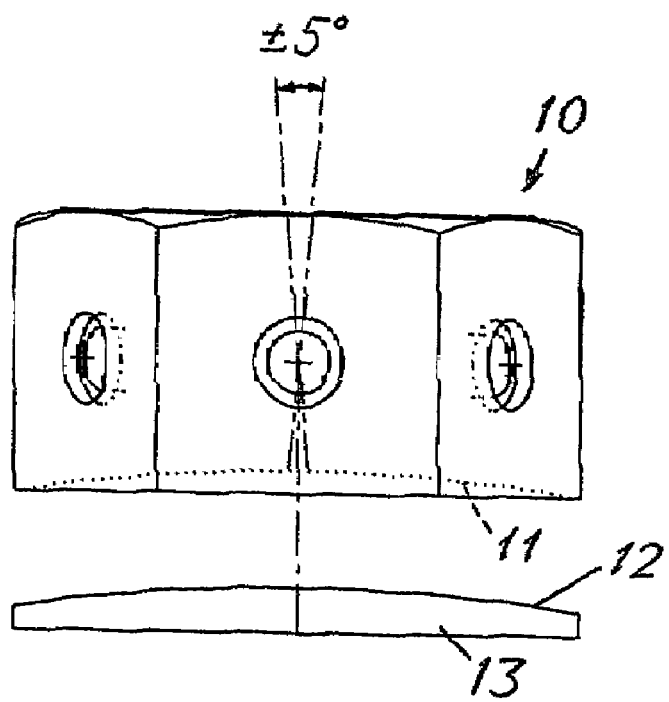
FIG. 4 shows side view of a nut having a concave abutment surface.

FIGS. 3 and 4 show nuts of the above-mentioned type. FIG. 3 shows a nut 8 that is provided with a spherically convex abutment surface 9, whereas FIG. 4 shows a nut 10 that is provided with a spherically concave abutment surface 11. This abutment surface is adapted for abutment against a corresponding convex abutment surface 12 on a washer 13.

By means of such nut embodiments one may absorb bolt disalignments within an anglular range of for example ±5°.

In principle, a series of types of sensor elements may be used, for example strain gauges, piezoresistive elements, etc. Normally it will be very important that one avoids connecting lines in the form of cables for transmitting the sensor signals to the associated recording device, since such cables will of course complicate and enhance the price of mounting/dismounting of the nuts. Therefore, in a preferred embodiment, there are used sensors in the form of so-called SAW sensors (SAW=Surface Acoustic Wave) having the property of being excitable and readable by radio. Each SAW sensor that is mounted at the bottom of a recess, then will be provided with an appurtenant antenna 7 that may be arranged somewhat recessed in the outer surface of the nut, as suggested in FIG. 2, so that the antenna is not damaged by tools or other handling. By means of a radio transmitter/receiver at a tuned frequency, energy is transmitted to the sensor which responds by a signal representing the stress load in the nut. The received signal is treated in the receiver of the recording device, and the pre-stressing of the bolt is shown on a display.

The range of the device will depend on the amount of supplied energy. This is in turn dependent on the size of the antenna. In order to obtain a larger antenna, this may alternatively be integrated in the top surface of the nut, for example be placed in an annular groove in the top surface, something which may give a range of 5-10 meters.

In those cases where there are several force-measuring nuts in the same region and/or several sensor elements on the same nut, the sensor may be arranged on a chip provided with a separate ID code and network property, for enabling communication with a selection of data from several sensors within the same region.

Even if it will be a substantial advantage in most applications to avoid connection lines, it may be of interest in certain cases to use cables between the sensors and the recording device. This may be particularly relevant in connection with large structures, i.e. in bolt/nut connections of large dimensions, or in applications in surroundings where the use of radio signals is not permitted.

The invention claimed is:

1. A device for measuring pre-stressing force in a bolt/nut connection, comprising a screw nut that is provided with a sensor means for sensing the pre-stressing force, characterised in that the nut (1) is of standard design and that the nut itself constitutes a sensor body in that, in the outer peripheral surface (2) of the nut, at the chosen distance from the abutting surface of the nut (1) against the support (5), there is machined at least one recess (3) in which there is placed a sensor (4) that is adapted for sensing mechanical stress in the nut, and for providing a signal representing the stress, for transmission to an external recording device.

2. A device according to claim 1, characterised in that the nut (1) is a standard hexagonal nut that is provided with a number of diametrically opposite recesses (3) in pairs.

3. A device according to claim 1 or 2, characterised in that the recess or recesses (3) is/are placed approximately midway between the upper and lower side of the nut (1), and has/have a depth corresponding to approximately half the wall thickness of the nut.

4. A device according to claim 3, characterised in that the nut (8) is shaped with a spherically convex abutment surface (9) that is adapted for abutment against a corresponding concave surface of the relevant support.

5. A device according to claim 3, characterised in that the nut (10) is shaped with a spherically concave abutment surface (11) that is adapted for abutment against a corresponding convex surface (12) of the relevant support (13).

6. A device according to claims 1 or 2, characterised in that the sensor (4) is a so-called SAW sensor (SAW=Surface Acoustic Wave) which can be excited and read by radio, and which is provided with an appurtenant antenna (7).

7. A device according to claim 6, characterised in that the sensor (4) is fit into the outer peripheral surface (2) of the nut (1) or in its top surface.

8. A device according to claim 7, characterised in that the sensor (4) is arranged to receive energy from the recording device at a tuned radio frequency, and to deliver a signal representing the stress condition in the nut (1).

9. A device according to claim 8, characterised in that each sensor (4) is provided with an ID code, for enabling communication with several sensors within the same region.

* * * * *